(12) United States Patent
Goraj (10) Patent No.: US 11,381,125 B2
(45) Date of Patent: Jul. 5, 2022

(54) ROTOR FOR AN ELECTRIC MACHINE (71) Applicant: Rolls-Royce Deutschland Ltd & Co KG, Blankenfelde-Mahlow (DE)

(72) Inventor: Robert Goraj, Erlangen (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 72 days.

(21) Appl. No.: 16/770,065

(22) PCT Filed: Nov. 29, 2018

(86) PCT No.: PCT/EP2018/083047
§ 371 (c)(1),
(2) Date: Jun. 4, 2020

(87) PCT Pub. No.: WO2019/110426
PCT Pub. Date: Jun. 13, 2019

(65) Prior Publication Data
US 2020/0389063 A1     Dec. 10, 2020

(30) Foreign Application Priority Data
Dec. 5, 2017    (DE) .................... 10 2017 221 878.9

(51) Int. Cl.
*H02K 1/27*        (2022.01)
*H02K 1/278*     (2022.01)
(52) U.S. Cl.
CPC ......... *H02K 1/278* (2013.01); *H02K 2213/03* (2013.01)
(58) Field of Classification Search
CPC ............... H02K 1/278; H02K 2213/03; H02K 1/27–1/2793
See application file for complete search history.

(56) References Cited

U.S. PATENT DOCUMENTS 4,678,954 A    7/1987   Takeda
8,049,374 B2   11/2011   Ku
(Continued)

FOREIGN PATENT DOCUMENTS

DE           10307231 A1    9/2004
DE      102013225093 A1    6/2015
(Continued)

OTHER PUBLICATIONS

Machine Translation, Wilke, WO-2015082528-A2, Jun. 2015. (Year: 2015).*

(Continued)

*Primary Examiner* — Thomas Truong
(74) *Attorney, Agent, or Firm* — Lempia Summerfield Katz LLC (57) ABSTRACT

A rotor for an electric machine is provided. Permanent magnets are disposed on the rotor such that the permanent magnets cannot carry out any tangential movement. The rotor may have four shoulders that extend away from a shell surface of the rotor in a radial direction. Primary permanent magnets that are disposed so as to be mutually contiguous and contiguous to the respective shoulders and accordingly cannot be displaced are in each case located between the shoulders. Secondary permanent magnets are disposed on the shoulders such that an annulus of magnets that is free of gaps and voids and is not movable in the tangential direction is formed.

15 Claims, 4 Drawing Sheets

(56) References Cited

U.S. PATENT DOCUMENTS

| | | | | |
|---|---|---|---|---|
| 2009/0174273 A1* | 7/2009 | Watanabe | ............ | H02K 1/276 |
| | | | | 310/156.53 |
| 2015/0091404 A1 | 4/2015 | Funakoshi | | |
| 2017/0338726 A1* | 11/2017 | Gandel | ................ | H02K 1/278 |
| 2018/0269733 A1* | 9/2018 | Mikami | .................. | H02K 3/28 |

FOREIGN PATENT DOCUMENTS

| | | | |
|---|---|---|---|
| DE | 112016003276 T5 | 4/2018 | |
| EP | 2704294 A1 | 3/2014 | |
| JP | S57145556 A | 9/1982 | |
| WO | WO-2015082528 A2 * | 6/2015 | ............ H02K 1/278 |
| WO | WO2017014211 A1 | 1/2017 | |

OTHER PUBLICATIONS

German Search Report for German Application No. 10 2017 221 878.9 dated Nov. 23, 2018.

International Search Report and the Written Opinion for International Patent Application PCT/EP2018/083047 dated Feb. 22, 2019.

* cited by examiner

ROTOR FOR AN ELECTRIC MACHINE

This application is the National Stage of International Application No. PCT/EP2018/083047, filed Nov. 29, 2018, which claims the benefit of German Patent Application No. 10 2017 221 878.9, filed Dec. 5, 2017. The entire contents of these documents are hereby incorporated herein by reference.

BACKGROUND

The present embodiments relate to a rotor for an electric machine and to the fastening of magnetic devices to the rotor.

As an alternative to the usual internal-combustion machines, concepts based on electric drive systems are experimented with and used for propelling aircraft (e.g., for airplanes or helicopters) or for electrically driven watercraft, etc. An electric or hybrid-electric drive system of this type typically has one or a plurality of electric machines, which, depending on the specific application in the drive system, may be configured as generators and/or as electric motors.

The electric drives and the corresponding machines to be used for mobile applications of this type are distinguished by extremely high power densities in order to be able to generate the output required. While power densities in the magnitude of up to 2 kW/kg are sufficient for many technical applications, electric machines having power densities that, depending on the application, may be in magnitudes of 20 kW/kg, are pursued for the electrification of aviation (e.g., for electrically or hybrid-electrically driven aircraft) or for other (e.g., mobile) applications.

Electric machines with a high power density are thus required for the mobile applications, where extreme requirements are often set for the components of the electric machine as the power density increases.

For example, it is to be assumed that the rotors of the electric machines are operated at high numbers of revolutions, which, for example, in the case of permanently excited machines has the consequence that correspondingly high centrifugal forces that act in the radial direction act on the surface magnets positioned on the rotor surface. The surface magnets are therefore to be held on the rotor with corresponding complexity (e.g., with the aid of so-called bandages), which has a negative effect on the dimensioning of the machine and possibly the air gap and/or the weight of the arrangement. This consequently has a negative impact on the power density.

Extremely high torques are to be transmitted from the permanent magnets to the rotor hub or vice versa in order to be able to provide the required power density. It is therefore to be provided that the magnets are also adequately attached to the rotor in the tangential direction, or in the circumferential direction, of the rotor, respectively. Friction—and/or positive-fitting connections of the magnets on the rotor are used for this, for example, where the friction-fitting connection may, for example, be supported by the use of the bandage.

A bandage of this type thus compensates for the centrifugal forces acting in the radial direction and prevents the permanent magnets from being separated from the rotor or from the rotor main body. The bandage presses the permanent magnets toward the main body, which creates a surface pressure at all contact points between the respective magnet and the surface of the rotor main body. The contact pressure per unit area herein is to be so great that the torque generated due to the electromagnetic interaction between the permanent magnets and the energized stator windings of the stator of the electrical machine is completely transmitted from the permanent magnets to the rotor main body, so that the permanent magnets with respect to the rotor main body are also not displaced in the tangential direction. In other words, the contact pressure per unit area is to be sufficiently high that forces acting in the tangential direction on the permanent magnets are also compensated for. Further, the contact pressure per unit area is to be sufficiently high to also possibly compensate for the magnetic tension in addition to the radial and tangential forces mentioned above.

The bandage thus generally fulfils several functions, specifically the prevention of radial movement of the permanent magnets due to centrifugal force, the enabling of a transmission of the torque to the main body, and possibly the compensation of the magnetic pull.

Increased mechanical requirements are set for the bandage on account of the multiple stresses. These requirements result in a corresponding choice of material, combined with an increased weight, and in a specific necessary minimum wall thickness of the bandage (e.g., in an extent of the bandage in the radial direction). Since the bandage is arranged in the air gap between permanent magnets and stator teeth, and the thickness of the air gap has a significant impact on the power density of the machine, the aim should be to keep the wall thickness of the bandage as small as possible, since the air gap may also be kept correspondingly thinner when the thickness is minor. This leads to an improved power density.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a reduction in a thickness of a bandage for an electric machine with a high power density is provided.

A rotor for an electric machine has a substantially cylindrical rotor main body with a partially imaginary, substantially hollow-cylindrical, inner or outer shell surface that delimits the rotor main body in a first radial direction, and a number of primary permanent magnets. The hollow-cylindrical, partially imaginary, shell surface is composed of a real shell surface as well as an imaginary shell surface. This will be explained in detail in the context of the description of the figures. The number of primary permanent magnets is completely distributed over k groups of primary permanent magnets with k≥1. For the case k>1, different groups may include different numbers of primary magnets or different groups may include the same number of primary magnets. The primary permanent magnets, when viewed in the tangential direction (e.g., in the circumferential direction and along the shell surface) are also disposed and configured successively on the shell surface such that the primary permanent magnets extend inward and outward from the shell surface in the first radial direction. The rotor main body has a group including at least one shoulder of n shoulders with n≥1, where each of the n shoulders extends away from the hollow-cylindrical shell surface in the first radial direction. The number k of groups of primary permanent magnets corresponds to the number n of shoulders. The primary permanent magnets and each of the shoulders, when viewed in the tangential direction, are disposed without forming or leaving any voids therebetween (e.g., so as not to form or leave, respectively, a void between two primary permanent magnets that are directly successive in the tangential direction, or between a permanent magnet and a shoulder that in the tangential direction neighbors the primary permanent magnet). The primary permanent magnets are therefore supported on the shoulders and are thus not movable in the tangential direction.

The requirement that the primary magnets and the shoulder(s) are disposed such that there are no voids also includes the realistic scenario that the magnets do not physically contact one another directly, but that, for example, an adhesive or similar is filled into the intermediate spaces between these magnets that are created by virtue of the absent physical contact. In practice, the secondary permanent magnets are indeed often disposed such that the tangential end faces of the secondary permanent magnets do not bear directly on one another and physically contact one another. Rather, in practice, there is a minor spacing between the mutually opposite end faces of the neighboring permanent magnets, where the intermediate space formed on account thereof is, however, filled by the adhesive. As a consequence, there is indeed an intermediate space located between two primary permanent magnets that are disposed successively in the tangential direction, but there is no void by virtue of the presence of the adhesive. Since such an adhesive is irrelevant to the solution presented here and the explicit mention would only lead to complications, reference hereunder will continue to be made only to the magnets and shoulders, without mentioning the adhesive in detail. It may be assumed that the potentially present adhesive is assigned to the magnets, so that the adhesive may be understood to be part of the magnet. The key point is that there is no void between the magnets, since the presence of such a void would offer the magnets the opportunity to move into the void.

The arrangement is such that a respective group of primary permanent magnets, no shoulder being disposed therebetween, forms a closed annular segment that may possibly include the adhesive located between two primary magnets. The entirety of all primary permanent magnets and all shoulders as well as any adhesive that may possibly be located between the magnets and/or the shoulders forms a closed annulus.

The primary permanent magnets are disposed such that in the case of no shoulder being located between two primary permanent magnets that are disposed successively in the tangential direction, no void lies between the primary permanent magnets. In the case of a shoulder being located between two primary permanent magnets disposed successively in the tangential direction, the primary permanent magnets are mutually spaced apart in the tangential direction and are disposed so as to form an intermediate space therebetween. The respective shoulder is disposed in the intermediate space. This results in the mentioned annulus, which is free of gaps and voids.

When viewed from the shell surface, each shoulder in the first radial direction has a respective radial extent ai with i=1, n, which is smaller than a respective radial extent h1 of the primary permanent magnets in the first radial direction (e.g., a<h1).

Further, 0<aMax≤0.9*h1, where a=Max(ai) (e.g., the value to be used for "a" represents the maximum value of the possibly variable values for ai). In one embodiment, ai=a=constant applies to all values of i.

A group of secondary permanent magnets that include at least one secondary permanent magnet is in each case provided for each shoulder and assigned to the respective shoulder. The secondary permanent magnets of a respective group are disposed in such a manner on the shoulder to which this group is assigned that each of the secondary permanent magnets of a respective group extends away from the respective shoulder in the first radial direction. This thus results in a closed annulus of permanent magnets composed of the primary magnets and the secondary magnets.

A respective secondary permanent magnet of a respective group herein in the first radial direction has a radial extent h2i=h1-ai, so that the surface of the ring of permanent magnets is substantially cylindrical.

It may apply that all shoulders have the same radial extent (e.g., ai=a with I=1, n). Accordingly, it also applies to the radial extents h2i of all secondary permanent magnets that h2i=h2=h1-a for i=1, . . . , n.

Each permanent magnet (e.g., the primary magnets as well as the secondary magnets) has in each case a tangential extent $\varphi_{p111}$, $\varphi_{p119}$ in the tangential direction, for which $0.1*\varphi_m \leq \varphi_{ai} \leq 10*\varphi_m$ where $\varphi_{ai}$, with i=1, . . . , n provides a tangential extent of a respective shoulder in the tangential direction, and where $\varphi_m \in [\varphi_{p111}, \varphi_{p119}]$ (e.g., $\varphi_m$ may represent $\varphi_{p111}$ or $\varphi_{p119}$, where $\varphi_{p111}$ provides the tangential extent of a respective primary permanent magnet and $\varphi_{p119}$ provides that of a secondary permanent magnet).

$\varphi_{ai}=\varphi_a$=constant may apply here.

Each secondary permanent magnet that is disposed on a respective shoulder in the tangential direction has a tangential extent $\varphi_{p119}$ such that no void lies between the secondary permanent magnet and the two primary permanent magnets that, when viewed in the tangential direction, lie in front of and behind the secondary permanent magnet. The magnets are thus in physical contact, possibly via the adhesive disposed therebetween. Consequently, an annulus of primary permanent magnets and secondary permanent magnets that is free of gaps and voids thus results. Since the primary magnets are supported on the shoulders, any tangential displacement, or movement of the entire annulus, respectively, is precluded.

The primary magnets and/or the secondary permanent magnets are in each case composed of a material that has a higher coefficient of thermal expansion than the materials of which the basic rotor body and/or the shoulders is/are composed. At the operating temperature, it is thus to be assumed that the magnets by virtue of the more intense expansion thereof are pressed against one another and against the shoulders. This also provides that no tangential movement of the magnets may take place in relation to the rotor main body.

The group of shoulders may have a number n>1 of shoulders that, when viewed in the tangential direction, may be disposed at regular or at irregular spacing, and thus may have identical or dissimilar mutual spacings.

Alternatively, it may apply that only a single shoulder is present (e.g., n=1).

Further, k>1 groups of primary permanent magnets may be provided, where different groups may have identical or dissimilar numbers of primary permanent magnets.

For the total number pm of permanent magnets, 1≤n≤pm-1, where pm represents the total number of permanent magnets and accordingly includes the primary permanent magnets as well as the secondary permanent magnets.

The compensation of the tangential force effect described at the outset by virtue of the torque generated is at least partially performed by the radial shoulders. In the ideal case, it may be assumed that the shoulders completely compensate for the tangential force effect, so that this function no longer has to be handled by the bandage. The bandage will therefore only have to fulfil two of the three functions mentioned above, specifically the compensation of the centrifugal forces and possibly the compensation of the magnetic pull. The magnetic pull does not necessarily arise in all designs of permanently excited electric drives with surface magnets.

The bandage due to less stress may thus be provided with a smaller wall thickness, which is why the air gap may be reduced in size, and the power density may thus be increased.

Further advantages and embodiments may be found in the drawings and corresponding description.

In the text that follows, the present embodiments will be explained in more detail with reference to drawings. In the drawings, identical components in different figures are characterized by identical reference symbols. It is therefore possible that when a second figure is being described, no detailed explanation will be given of a specific reference symbol if the symbol has already been explained in relation to another, first figure. In such a case, with the embodiment according to the second figure, it may be assumed that, even without detailed explanation, the component characterized by this reference symbol has the same properties and functionalities in relation to the second figure as explained in relation to the first figure.

DETAILED DESCRIPTION

Terms such as "axial", "radial", "tangential", etc. relate to a shaft or axis used in the respective figure or in the example described in each case. In other words, directions axial, radial, and tangential relate to an axis of rotation of the rotor. "Axial" herein describes a direction parallel to the axis of rotation, "radial" describes a direction orthogonal to the axis of rotation, toward or away from the axis of rotation, and "tangential" is a movement or direction, respectively, that is directed at a constant radial spacing from the axis of rotation and with a constant axial position in a circle around the axis of rotation.

The terms "axial", "radial" or "tangential", respectively, in the context of an area (e.g., a surface), may be that a normal vector of the respective axial, radial or tangential surface is oriented in the axial, radial or tangential direction. On account of this, the orientation of the respective area in space is unequivocally described.

Figure 1:
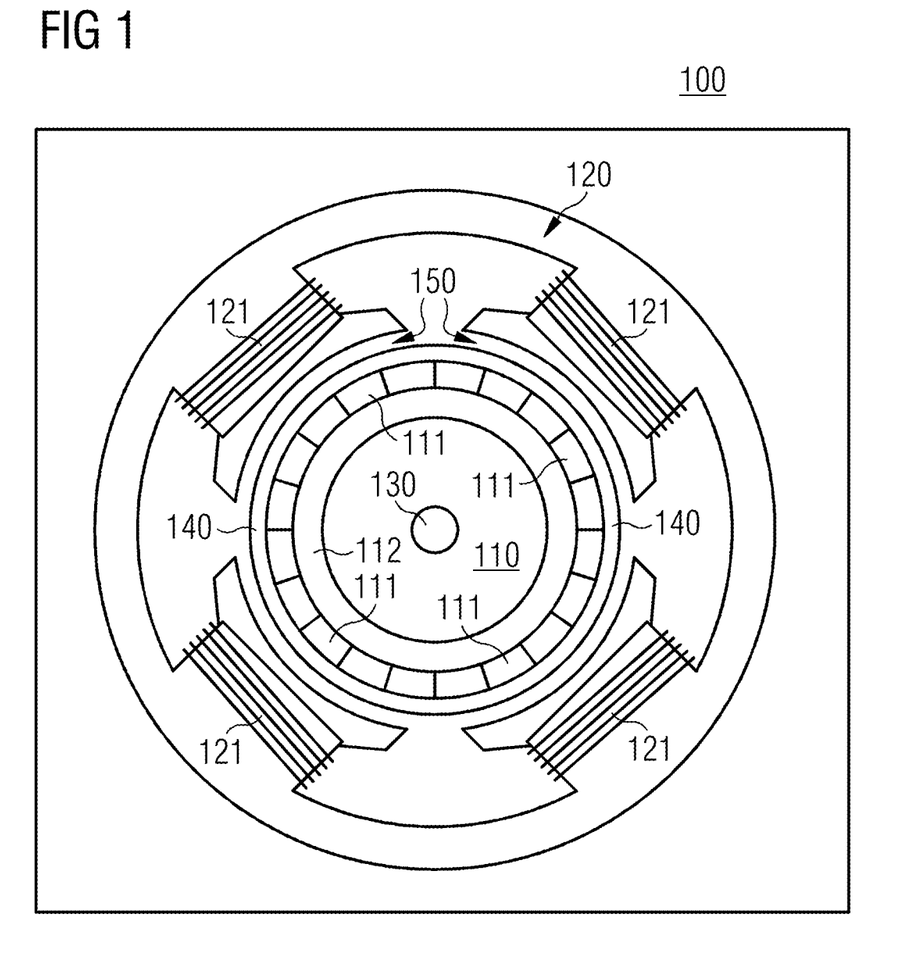
FIG. 1 shows a known electric machine.

FIG. 1 shows, in an exemplary manner, an electric machine 100 that is configured as an electric motor as is known in the prior art. The electric machine 100, in a similar construction, may also be operated as a generator. The construction of the machine described hereunder is greatly simplified and does not show some of the details explained in connection with the other figures; rather, the simplified construction serves only to illustrate the fundamental functional mode of the electric motor. It may be assumed to be known that the various components of the machine may be disposed differently depending on the design of the electric machine as a generator or as an electric motor and/or as, for example, a radial or axial flow machine with a rotor designed as an internal or external rotor, etc.

The electric motor 100 has a stator 120 and a rotor 110 configured as an internal rotor. The rotor 110 is disposed within the stator 120 and in the operating state of the electric motor 100 rotates about an axis of rotation. The rotor 110, or a substantially cylindrical rotor main body 112 of the rotor 110, respectively, is connected in a rotationally fixed manner to a shaft 130, so that a rotation of the rotor 110 may be transmitted via the shaft 130 to a component to be driven (not shown) (e.g., to a propeller of an aircraft).

The stator 120 has a first magnetic device 121 that may be implemented, for example, as stator windings 121. Each of the windings 121 is formed by at least one electric conductor through which an electric current flows when the electric motor 100 is in operation. The rotor 110 has a second magnetic device 111 that may be configured, for example, as permanent magnets or as excited or excitable windings (for the sake of clarity, only a few reference signs are used for the second magnetic device 111). It is assumed hereunder that the magnets are permanent magnets 111. A bandage 140, substantially configured as a hollow cylinder, is disposed externally about the rotor 110 having the permanent magnets 111, so as to provide, as explained at the outset, that the magnets 111 remain in place even when the rotor 110 is rotating.

The first magnetic device 121 and the second magnetic device 111 are configured and spaced apart from one another by an air gap 150 such that the first magnetic device 121 and the second magnetic device 111 in the operating state of the electric motor 100 interact electromagnetically with one another. This concept including the conditions for the configuration and precise disposal of the first magnetic device 121 and the second magnetic device 111, or of the rotor 110 and the stator 120, are known and are therefore not explained in more detail hereunder. In order to operate the electric machine 100 as an electric motor, the stator windings 121 are impinged with an electric current with the aid of a not shown energy source. The electric current causes the windings 121 to generate corresponding magnetic fields that come to interact electromagnetically with the magnetic fields of the permanent magnets 111 of the rotor 110. This results in a torque acting on the permanent magnets 111, which, provided that the permanent magnets 111 are connected sufficiently firmly to the rotor main body 112, results in the rotor 110 and conjointly therewith the shaft 130 being set in rotation when the components are suitably configured and disposed in relation to one another.

As already explained at the outset, the permanent magnets 111 (e.g., when viewed in the tangential direction) are firmly connected to the rotor main body 112. As has likewise been explained at the outset, this may be achieved in that the magnets 111, in addition to a corresponding adhesive bond to the rotor main body 112, with the aid of the substantially cylindrical bandage 140, are pressed strongly against the main body 112. This enables a contact pressure per unit area that forms or increases, respectively, the friction-fit between the magnets 111 and the main body 112.

The bandage 140 has the effect that the magnets 111 are held at respective positions on the main body 112 even when the rotor 110 is rotating and despite the centrifugal forces arising herein. The bandage 140 thus compensates for the centrifugal forces acting in the radial direction and prevents the separation of the permanent magnets 111 from the rotor 110 or from the rotor main body 112, respectively. The bandage 140 presses the permanent magnets 111 toward the main body 112. On account of this, a contact pressure per unit area is created at all contact points between the respective magnet 111 and the surface 113 of the main body 112.

The contact pressure per unit area is to be so high that the torque generated due to the electromagnetic interaction between the permanent magnets 111 and the energized stator windings 121 of the stator 120 of the electrical machine 100 is completely transmitted from the permanent magnets 111 to the rotor main body 112, such that the permanent magnets 111 in relation to the rotor main body 112 are also not displaced in the tangential direction. In other words, the contact pressure per unit area is to be sufficiently high that even forces acting in the tangential direction on the permanent magnets 111 are also compensated for. The latter is typically achieved in that the bandage 140 is configured so as to be correspondingly strong by having a correspondingly large thickness (e.g., an extent in the radial direction).

Figure 2:
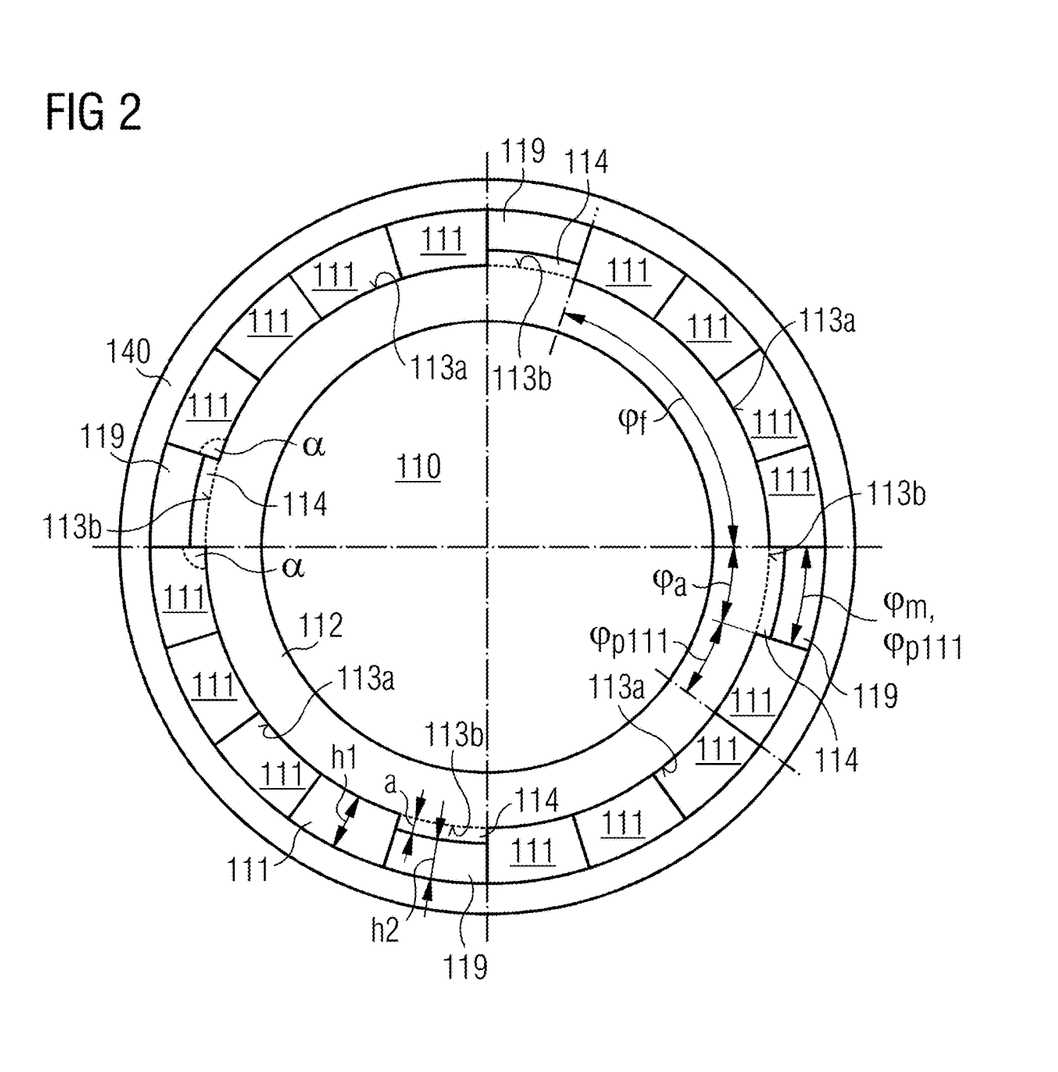
FIG. 2 shows a cross section of a rotor according to an embodiment.

FIG. 2 no longer shows the complete machine 100 but only the rotor 110 having the main body 112 and the permanent magnets 111, 119. The stator 120 with the components thereof is not illustrated in FIG. 2. In terms of the permanent magnets, a differentiation is made between primary permanent magnets 111 and secondary permanent magnets 119.

The rotor base body 112 differs from the rotor base body according to the prior art in that, on the partially imaginary shell surface 113 of the rotor main body 112 that delimits the base body 112 in a first radial direction, shoulders 114 that in the first radial direction project by a radial extent or height a, respectively, are provided so as to be distributed along the circumference of the main body 112. Primary permanent magnets 111 are located between shoulders 114, as will yet be explained in greater detail hereunder. The "partially imaginary" shell surface 113 mentioned is composed of the real surface 113a of the rotor main body 112, on which the primary magnets 111 are disposed, and an imaginary surface 113b of the rotor main body for regions where no primary magnets 111 but the shoulders 114 are located. In order to define the "partially imaginary" shell surface 113, the imaginary shell surface 113b continues geometrically in these regions between two real shell surfaces 113a (e.g., with regard to the curvature, as in the two real shell surfaces 113a neighboring the imaginary shell surface 113b). The imaginary shell surface 113b in FIG. 2 is indicated by the dashed lines in those regions in which the shoulders 114 but no primary magnets 111 are located. Overall, it follows that the partially imaginary shell surface 113 as a whole is hollow-cylindrical. The shoulders 114 would be placed on the imaginary shell surface 113b.

To further justify the expression "partially imaginary", such a rotor 110 may be manufactured in practice with the aid of additive manufacturing. In this case, the shoulders 114 would not be placed on the rotor base body 112 as separate components, but rather, the rotor 110 would be manufactured integrally, including the shoulders 114. In this case, the imaginary shell surface 113b is thus truly only "imaginary", since the shell surface is not apparent in reality.

The first radial direction, in the event of the electric motor 100 being an internal rotor motor, is directed outward from the axis of rotation. This case is illustrated in FIGS. 1 and 2. In one embodiment, only a single shoulder 114 of this type may be provided. It is, however, assumed hereunder that at least two shoulders 114 are present. Four shoulders 114 are assumed in an exemplary manner in FIG. 2.

In the embodiment illustrated in FIG. 2, the shoulders 114 with the height a are distributed uniformly along the circumference of the base body 112 such that two shoulders 114 that are disposed successively in the circumferential direction (e.g., in the tangential direction) are respectively spaced apart from one another (e.g., the two shoulders 114 are not mutually contiguous). "Uniformly distributed" may be that the spacings in the tangential direction between in each case two successive shoulders 114 (e.g., the spacing between a first shoulder and a second shoulder therebehind), and the spacing between the second shoulder and a third shoulder therebehind, etc. are identical. The tangential extent of each shoulder 114 (e.g., the length of the shoulder 114 when viewed in the circumferential direction) is such that a respective shoulder 114 covers an angle $\varphi_a$. The spacing between two shoulders 114 that are successive in the tangential direction is such that the void lying between the shoulders 114 covers an angle $\varphi_f$. By virtue of the uniform distribution of the shoulders 114 in this case, this consequently applies to the case in which n shoulders 114 and accordingly also n voids are provided that $n*\varphi_a + n*\varphi_f = 360°$.

In each void between shoulders 114 that are disposed successively in the tangential direction, there is in each case located a group of m primary permanent magnets 111, where m is an integer (e.g., m=4). The primary permanent magnets 111 herein are disposed on the real shell surface 113a. The number k of groups of primary magnets 111 corresponds to the number n of shoulders 114.

These primary magnets 111 are dimensioned such that the primary magnets 111 in the first radial direction extend away from the real shell surface 113a by a radial extent or height h1.

It is, for example, provided that the primary permanent magnets 111 cannot perform any movement in the tangential direction between two shoulders. The primary magnets 111, when viewed in the tangential direction, are disposed and dimensioned such that there is a void neither between two primary permanent magnets 111 that are disposed successively in the tangential direction and between which no shoulder 114 is located, nor between a respective primary magnet 111 and a shoulder 114 neighboring the magnet 111. The presence of a "void" next to a primary magnet 111 may provide that this primary magnet 111 may be able to slide into the void, so that the set of problems described at the outset and to be presently solved would arise.

Each of the primary permanent magnets 111, in the state installed in the rotor 110, may be dimensioned as seen in a tangential direction such that the respective primary permanent magnet 111 covers an angle $\varphi_{p111}$. In order to ideally completely fill the voids between two shoulders 114 with primary permanent magnets 111 and thus to meet the requirement that there are no voids between two magnets 111 or between a magnet 111 and a shoulder 114, $\varphi_f = m*\varphi_{p111}$ may apply. In practice, however, this is typically not implemented, but the secondary permanent magnets 111 are often disposed such that the tangential end faces of the secondary permanent magnets 111 do not bear directly on one another and physically contact one another. Rather, in practice, there is a minor spacing between the mutually opposed end faces of the neighboring permanent magnets 111 and between such an end face and the tangential lateral wall of a neighboring shoulder 114 opposite the end face. The intermediate spaces formed on account thereof are, however, filled by an adhesive, for example. As a consequence, there is thus an intermediate space located between two primary permanent magnets 111 that are disposed successively in the tangential direction, but there is no void by virtue of the presence of the adhesive. The key point is that there is no void between the magnets 111 and, if applicable, the shoulders 114, since the presence of such a void would offer the magnets 111 the possibility of moving into the void. The term "void" thus differs from the term "intermediate space" in that there is nothing, or only air, respectively, in the "void", while the "intermediate space" may indeed also contain air but has, for example, a material that prevents a movement of the objects (e.g., of the magnets 111), between which the intermediate space is located, into the intermediate space.

In summary, the tangential extents (pa of the shoulder 114 and (poll of the permanent magnets 111, respectively, are thus selected, and the adhesives frequently used in practice between the magnets 111 and the shoulders 114 are taken into account such that the totality of the primary permanent magnets 111, the totality of the shoulders 114, as well as the adhesives located between magnets 111 and shoulders 114 form a continuous, annulus free of gaps and voids, respectively. No void is formed between any two objects 111, 114 of the annulus that are successive in the tangential direction.

The adhesive is irrelevant to the solution presented here, and the explicit mention and representation only leads to unnecessary complications in the description. For the sake of simplicity of the description, the adhesive hereunder is therefore assigned to a respective primary permanent magnet 111. This results in that the adhesive is no longer referred to as an individual component. If, for example, a wording such as "the primary permanent magnets 111 are dimensioned such that X" is used, this provides "the primary permanent magnets 111 including the adhesives located therebetween are dimensioned such that X." The same applies to the secondary permanent magnets 119 to be introduced hereunder. In this approach, it thus follows that the entirety of the primary permanent magnets 111 and the entirety of the shoulders 114 form the continuous annulus free of gaps and voids, respectively. No void is formed between any two objects 111, 114 of the annulus that are successive in the tangential direction. This provides that the annulus is free of gaps, and objects 111, 114 of the annulus that are successive in the tangential direction are mutually contiguous. "Objects" of this type of the annulus may be primary permanent magnets 111, or shoulders 114, as well as the adhesives.

The radial extents a and h1 of the shoulders 114 and of the primary permanent magnets 111, respectively, are selected such that h1>a. The extents a, h1 herein are chosen, for example, such that 0<a≤0.9*h1. It is therefore provided, because of a>0, that the shoulders 114 protrude beyond the hollow-cylindrical shell surface 113 in the first radial direction. Because of a≤0.9*h1, it follows that the primary permanent magnets 111 with respect to the shoulders 114 project in the radial direction.

The rotor 110 described so far accordingly has at least one group, but typically a plurality of groups, of primary permanent magnets 111. FIG. 2 in an exemplary manner shows k=4 groups of primary permanent magnets 111, with each of the groups including m=4 primary permanent magnets 111. As has likewise already been mentioned, a shoulder 114 is located in each case between two groups of this type. The shoulder 114 thus provides that the entirety of primary permanent magnets 111 does not solely form an uninterrupted annulus. In other words, there is a number of interruptions corresponding to the number n≥1 of shoulders 114.

In order to compensate for the reduced efficiency or power density, respectively, of the electric motor 100 by virtue of the at least one interruption of the annulus of primary permanent magnets 111, at least one secondary permanent magnet 119 is disposed on each shoulder 114 such that the respective secondary permanent magnet 119 from the shoulder 114 on which the secondary permanent magnet 119 is disposed extends away in the first radial direction.

The secondary permanent magnets 119 herein are dimensioned such that h2=h1−a applies to the extent h2 of the secondary permanent magnets 119 in the radial direction. At the same time, in the embodiment shown, the extent of the magnets $\varphi_{p119}$ in the tangential direction is $\varphi_{p119}=\varphi_a$ (e.g., the secondary permanent magnets 119 extend tangentially across the same angle as the shoulders 114 on which the secondary permanent magnets 119 are disposed). The dimensioning of the secondary magnets 119 in the radial direction and the tangential direction leads to the outer surface of the overall assembly consisting of the primary permanent magnets 111 and the secondary permanent magnets 119 being cylindrical. In the case of $\varphi_{p119}=\varphi_a$, it is to be assumed that the primary permanent magnets 111 neighboring a respective shoulder 114 are not only contiguous to the respective shoulder 114, but also to the secondary magnet 119 disposed on the respective shoulder. This leads to the entirety of the primary permanent magnets 111 and the secondary permanent magnets 119 forming a continuous annulus that is free of gap and voids, respectively, and has a cylindrical surface.

For the sake of clarity, as already explained in the context of the primary magnets 111, it also applies to the secondary permanent magnets 119 that adhesive is used in practice. Specifically, this provides that an adhesive is in each case located between the secondary magnet 119 and the two primary magnets 111 neighboring the magnet 119. As also already explained above, this adhesive is not to be mentioned further (e.g., the adhesive is assigned to the magnet 119). If, for example, a wording such as "the secondary magnets 119 are dimensioned such that Y" is used, this provides that "the secondary magnets 119 including the corresponding adhesives are dimensioned in such a manner that Y."

In principle, the following is to apply to the tangential extents $\varphi_{p111}$, $\varphi_{p119}$ of each permanent magnet 111, 119: $0.1*\varphi_m \leq \varphi_a \leq 10*\varphi_m$, where $\varphi_m$ is to represent $\varphi_{p111}$ as well as $\varphi_{p119}$. It thus applies to each individual magnet 111, 119 that the respective tangential extent thereof should meet the specified condition. However, this does not require that all magnets 111, 119 have the same tangential extent.

The total number pm of permanent magnets 111, 119 results in pm=pm1+pm2 with a total number pm1 of primary permanent magnets 111 and a total number pm2 of secondary permanent magnets 119. The following may also apply to the correlation with the number n of shoulders 114: 1≤n≤pm−1.

By virtue of the dimensions of the magnets 111, 119 and the shoulders 114 described (e.g., in the tangential direction), it is achieved that a closed annulus is formed, where the primary permanent magnets 111 are supported on the shoulders 114. This has the effect that the requirements on the bandage 140 with regard to the compensation of forces in the tangential direction are substantially or even completely eliminated, since the respective contiguous disposal (e.g., of the primary magnets 111 and the shoulders 114) prevents the magnets 111 from moving tangentially. This effect is also influenced by a corresponding selection of those angles α that enclose the respective tangential lateral areas of the shoulders 114 having the partially imaginary shell surface 113. For example, it may apply that α=90°.

In order to provide that the magnets 111, 119 cannot perform any tangential movements and the torque is thus completely transmitted to the rotor main body 112, the bandage 140 is to provide that no movement of the magnets 111 takes place in the radial direction.

Figure 3:
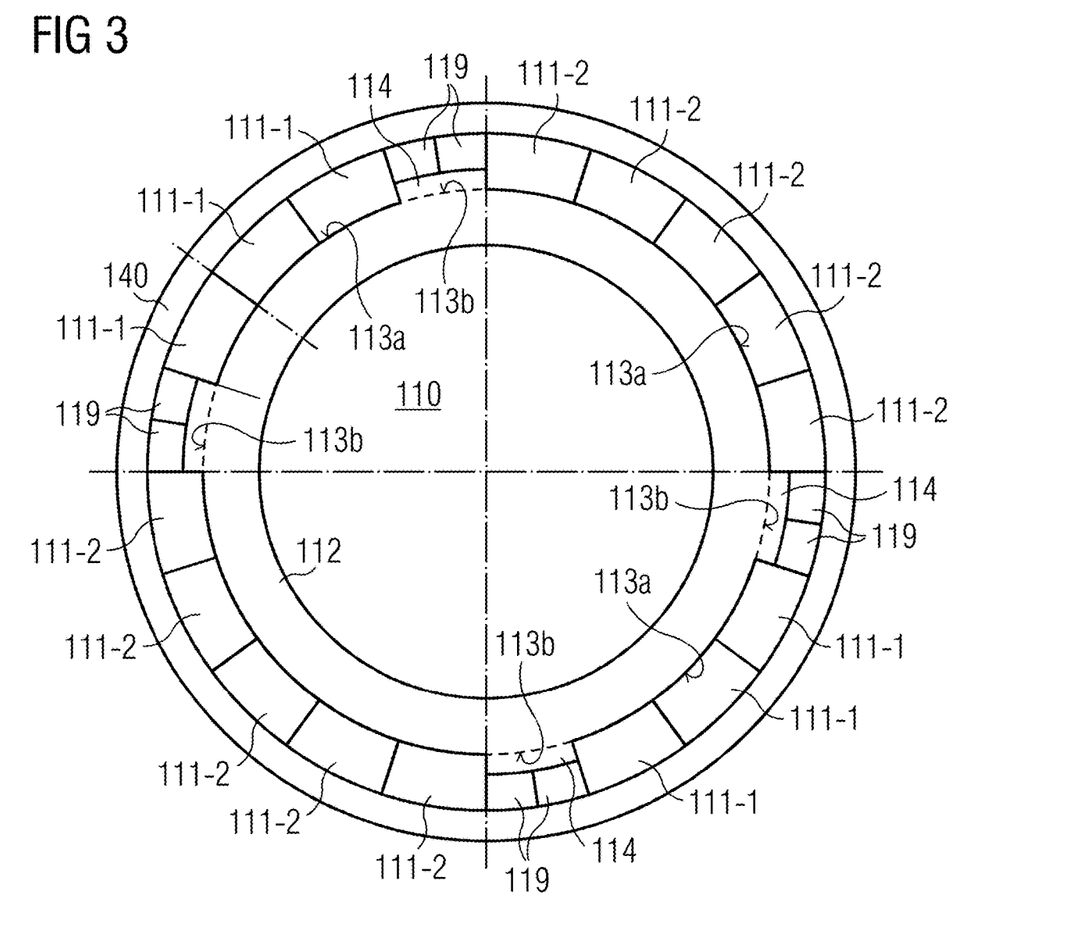
FIG. 3 shows a cross section of the rotor in an alternative embodiment.

In the context of FIG. 2, it is assumed that the shoulders 114 are uniformly distributed along the circumference of the main body 112. This is, however, not a necessary condition. It is possible that the shoulders 114 are distributed in a non-uniform manner (e.g., the tangential spacings between two respective shoulders 114 that are disposed successively in the circumferential direction are dissimilar). It is assumed in FIG. 2 that each of the groups of primary permanent magnets 111 has the same number of primary magnets 111. This is also not a necessary prerequisite for the functionality of the present embodiments. It is possible that different groups of primary permanent magnets 111 have different numbers of primary permanent magnets 111. FIG. 3, in a purely exemplary manner, shows an embodiment in which these aspects are taken into account. The rotor shown again has n=4 shoulders and accordingly k=4 groups of primary permanent magnets 111, but two of the groups each have m1=3 primary magnets 111-1, and the other two groups include in each case m2=5 primary permanent magnets 111-2. Other combinations are not shown separately, but may also be provided. For example, only three groups and three shoulders may be present, where it is possible for m1=3, m2=4, m3=5 to apply to the numbers m1, m2, m3 of the primary permanent magnets 111 in the three groups. These numerical values are purely exemplary.

The secondary permanent magnets 119 (e.g., in the tangential direction) may also be dimensioned such that, when viewed in the tangential direction, two or even more secondary magnets 119 are to be disposed on the respective shoulder 114. For example, the case in which two secondary magnets 119 are respectively disposed on the shoulders is indicated in FIG. 3.

It has likewise previously been assumed that the shoulders 114 all have the identical height a. This is also not required. In other words, different shoulders 114$i$ with i=1, . . . , n may have different heights ai.

Figure 4:
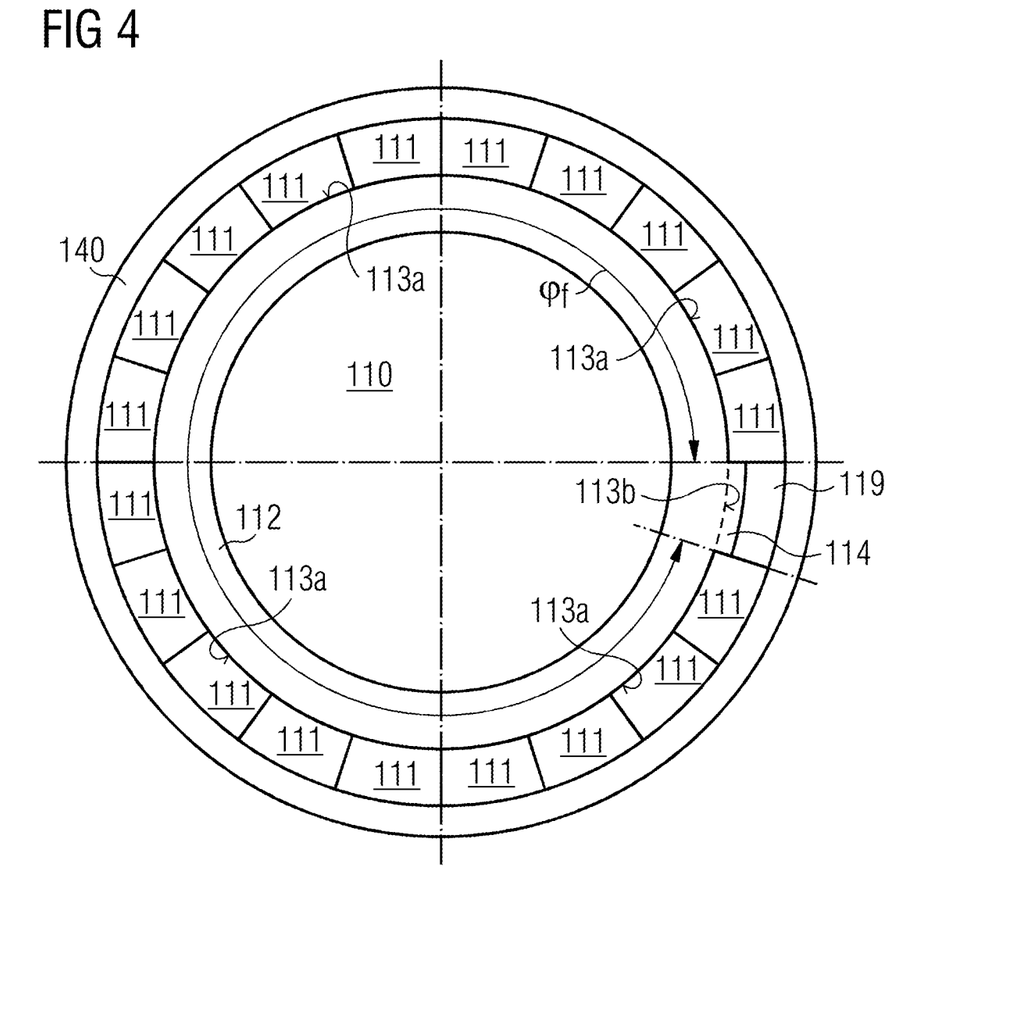
FIG. 4 shows a cross section of the rotor in a further embodiment.

FIG. 4 shows the case in which only a single shoulder 114 is provided. The primary permanent magnets 111 with the shoulder 114 are arranged such that, again including any adhesive that may be present, there are no voids located between adjacent magnets 111 and between the magnets 111 and the shoulder 114.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A rotor for an electric machine, the rotor comprising:
   a rotor main body that is substantially cylindrical, with a shell surface that is partially imaginary, substantially hollow-cylindrical, the shell surface delimiting the rotor main body in a first radial direction; and
   a plurality of primary permanent magnets,
   wherein the plurality of primary permanent magnets is distributed among k groups of primary permanent magnets with k≥1,
   wherein the plurality of primary permanent magnets, when viewed in a tangential direction, are disposed and configured successively on the shell surface such that the plurality of primary permanent magnets extend away from the shell surface in the first radial direction,
   wherein the rotor main body has a group comprising at least one shoulder of n shoulders with n≥1,
   wherein each of the n shoulders extends away from the substantially hollow-cylindrical shell surface in the first radial direction,
   wherein the plurality of primary permanent magnets and each of the shoulders, when viewed in the tangential direction, are disposed without leaving any voids therebetween,
   wherein a group of secondary permanent magnets that comprises at least one secondary permanent magnet is in each case provided for each of the shoulders and assigned to the respective shoulder, and
   wherein the at least one secondary permanent magnet of a respective group is disposed in such a manner on the shoulder to which the group is assigned that each of the secondary permanent magnets of a respective group extends away from the respective shoulder in the first radial direction.

2. The rotor of claim 1, wherein the plurality of primary permanent magnets are disposed such that:
   in the case of none of the shoulders being located between two primary permanent magnets of the plurality of primary permanent magnets that are disposed successively in the tangential direction, no void lies between the plurality of primary permanent magnets; and
   in the case of a shoulder of the shoulders being located between two primary permanent magnets of the plurality of primary permanent magnets that are disposed successively in the tangential direction, the plurality of primary permanent magnets are mutually spaced apart in the tangential direction and are disposed so as to form an intermediate space therebetween, and
   wherein the respective shoulder is disposed in the intermediate space.

3. The rotor of claim 1, wherein each of the shoulders in the first radial direction has a respective extent that is smaller than a respective extent of the plurality of primary permanent magnets in the first radial direction.

4. The rotor of claim 3, wherein 0<a≤0.9*h1, where a=Max(ai), ai is the respective extent of the respective shoulder in the first radial direction, and h1 is the respective extent of the plurality of primary permanent magnets in the first radial direction.

5. The rotor of claim 4, wherein a respective secondary permanent magnet of a respective group in the first radial direction has a radial extent h2$i$=h1−ai.

6. The rotor of claim 1, wherein each permanent magnet of the plurality of primary permanent magnets and the group of secondary permanent magnets has in each case an extent $\varphi_{p111}$, $\varphi_{p119}$ in the tangential direction, where $0.1*\varphi_m \leq \varphi_{ai} < 10*\varphi_m$,
   wherein $\varphi_{ai}$ provides an extent of a respective shoulder in the tangential direction, and
   wherein $\varphi_m \in [\varphi_{p111}, \varphi_{p119}]$.

7. The rotor of claim 1, wherein each secondary permanent magnet that is disposed on a respective shoulder in the tangential direction has an extent such that no void lies between the respective secondary permanent and the two primary permanent magnets that, when viewed in the tangential direction, lie in front of and behind the secondary permanent magnet.

8. The rotor of claim 1, wherein the secondary permanent magnets are composed of a material that has a higher coefficient of thermal expansion than materials of which the rotor main body, the shoulders, or the rotor main body and the shoulders are composed.

9. The rotor of claim 1, wherein the primary permanent magnets are composed of a material that has a higher coefficient of thermal expansion than materials from which the rotor main body, the shoulders, or the rotor main body and the shoulders are composed.

10. The rotor of claim 1, wherein the group of shoulders has a number n>1 of shoulders that, when viewed in the tangential direction, are disposed at irregular spacings.

11. The rotor of claim 1, wherein n=1 applies to the group of shoulders.

12. The rotor of claim 1, wherein k>1 groups of primary permanent magnets are provided, and wherein at least two of the groups of primary permanent magnets have dissimilar numbers of primary permanent magnets.

13. The rotor of claim 1, wherein $1 \leq n \leq pm-1$, and wherein pm represents a total number of permanent magnets.

14. The rotor of claim 1, wherein the respective at least one secondary permanent magnet provided for a shoulder of the at least one shoulder includes two or more secondary permanent magnets, such that each of the two or more secondary permanent magnets extends away from the shoulder in the first radial direction.

15. The rotor of claim 1, wherein no part of the rotor main body extends in the first radial direction to a radial extent of the rotor, such that the plurality of primary permanent magnets and the group of secondary permanent magnets form a closed annulus of permanent magnets.

* * * * *